Feb. 25, 1958  E. W. RISTOW ET AL  2,824,455
PORTABLE RECIPROCATING SAW
Filed June 27, 1952
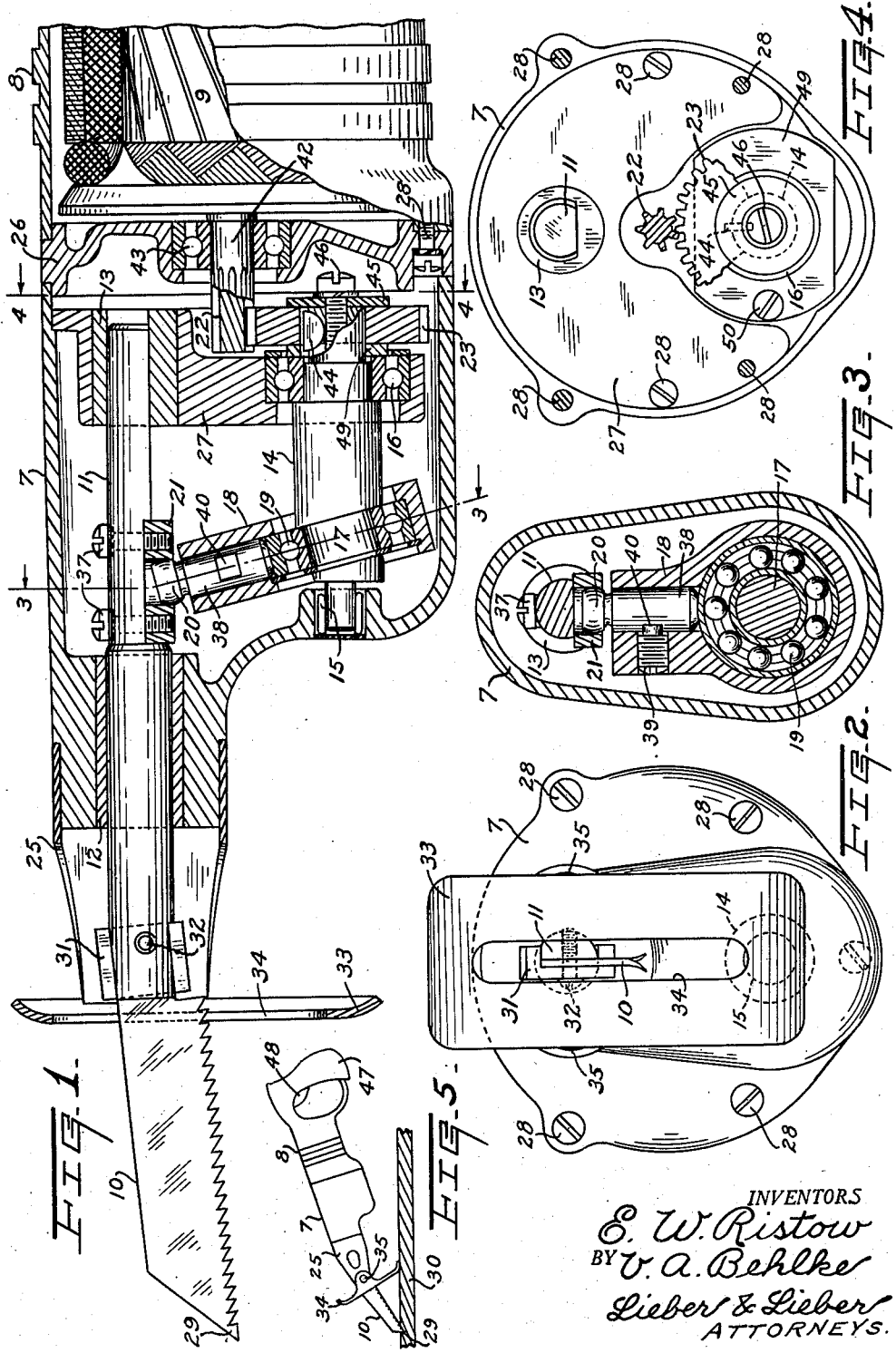
INVENTORS
E. W. Ristow
BY V. A. Behlke
Lieber & Lieber
ATTORNEYS.

United States Patent Office 2,824,455
Patented Feb. 25, 1958

2,824,455
PORTABLE RECIPROCATING SAW

Edward W. Ristow, Wauwatosa, and Versel A. Behlke, Greenfield, Wis., assignors to Milwaukee Electric Tool Corporation, Milwaukee, Wis., a corporation of Wisconsin Application June 27, 1952, Serial No. 295,902

3 Claims. (Cl. 74—60)

Our invention relates generally to improvements in cutting tool assemblages, and relates more particularly to improvements in the construction and operation of high speed power driven portable reciprocating cutting units.

The primary object of the present invention is to provide a simple, compact and durable portable reciprocating cutting device which is readily manipulable to cut various kinds of material along straight, curved, or irregular lines of severance, with the aid of a saw blade, file, or other type of cutting tool.

Some of the more important specific objects of the invention are as follows:

To provide a reciprocable cutting unit of rugged construction in which all parts which are subject to most wear due to severe handling, are readily accessible and replaceable.

To provide a small but powerful sawing tool which is operable at high speed to cut either wood, metal, or composite materials in any desired direction and into varied shapes.

To provide a high speed power driven portable sawing assemblage in which friction losses are reduced to a minimum with the aid of extensive anti-friction bearings.

To provide an electric motor propelled reciprocating saw of utmost simplicity which may be readily assembled or dismantled, and wherein the rotation of the motor rotor is converted into reciprocating motion of the saw blade by well protected and efficient transmission mechanism.

To provide a compact portable reciprocating saw unit in which the cut may be started within the bounding margins of flat sheets, without the aid of drill holes or the like.

To provide a portable power driven reciprocating sawing device, of light weight but of sturdy construction adapted for diverse uses, and which may be manufactured and operated at minimum cost.

These and other more specific objects and advantages of the invention will be apparent from the following description from which it will be noted that the gist of the improvement is the provision of a portable reciprocable saw unit comprising a casing, an electric motor secured to one end of the casing and having a rotor adjoining the casing interior, a saw blade protruding from the opposite end of the casing, an elongated shaft member carrying the blade, and being guided for longitudinal reciprocation within the casing, a rotary shaft journalled within the casing laterally of the reciprocable member and having a crank disposed at an oblique angle relative to the shaft axis, an arm element oscillatable along the shaft axis by the crank and being cooperable with the saw carrying member to reciprocate the blade whenever the shaft is rotated, and speed reducing gearing drivingly connecting the motor rotor with the crank shaft.

A clear conception of the features constituting the present improvement, and of the construction and operation of a typical portable motor driven reciprocating saw unit embodying the invention, may be had by referring to the drawing accompanying and forming a part of this specification in which like reference characters designate the same or similar parts in the various views.

Fig. 1 is a central longitudinal section through the saw blade reciprocating mechanism of the unit and through a fragment of the actuating motor;

Fig. 2 is a front end view of the unit looking toward the reciprocating saw blade and the adjacent guide plate;

Fig. 3 is a transverse section through the same unit, taken along the line 3—3 of Fig. 1;

Fig. 4 is another transverse section through the unit taken along the line 4—4 of Fig. 1; and Fig. 5 is a diagrammatic side view of the entire unit drawn to a reduced scale, and showing the manner in which it may be applied to a flat work sheet.

While the invention is advantageously applicable to a portable electric motor driven reciprocable saw unit such as shown by way of illustration, it is not the intent to unnecessarily restrict the use of the improved features by virtue of this limited showing of only one commercial embodiment; and it is also contemplated that specific descriptive terms be given the broadest possible interpretation consistent with the disclosure.

Referring to the drawing, the typical portable reciprocable saw unit shown therein comprises in general, a hollow casing 7 having an electric motor 8 secured to one end and provided with a rotor 9 adjoining the casing interior; a flat elongated saw blade 10 protruding from the opposite smaller end of the casing 7; an elongated shaft member 11 secured to and supporting the blade 10 and being guided for longitudinal reciprocation within the casing 7 in alined front and rear guide bearings 12, 13 respectively; a rotary shaft 14 journalled in alined front and rear bearings 15, 16 respectively, within the casing 7, and having a medial crank 17 disposed at an oblique angle relative to the shaft axis; an oscillatory arm eleemnt 18 having its lower portion journalled on a bearing 19 carried by the crank 17 while its upper portion is provided with a spherical head 20 oscillatably confined within a socket 21 secured to the shaft member 11; and a pair of intermeshing speed reducing gears 22, 23 drivingly connecting the motor rotor 9 with the crank shaft 14.

The casing 7 consists of a main section within which the bearings 12, 15 are directly confined, a front guide section 25 secured to the forward end of the main section, a rear closure section 26 for separating the interior of the main casing section from the motor 8, and a transverse medial wall 27 in which the bearings 13, 16 are supported. All of these parts are detachably interconnected by screws 28 or the like, and are formed of light but durable metal so as to reduce the weight of the portable unit to a minimum. The saw blade 10 preferably has a pointed forward end 29 adapted to pierce sheet stock 30 as illustrated in Fig. 5 when starting a cut within the boundaries of the sheet; and the rear end of the blade 10 is firmly but detachably secured to the forward semi-circular end of the shaft member 11 by means of a U-shaped block 31 and a screw 32 as illustrated in Figs. 1 and 2. The block 31 is slidably confined within the front casing section 25, and the blade 10 may be disposed at a slight fixed angle relative to the central longitudinal axis of the member 11; while a guide shoe 33 having therein a slot 34 through which the saw blade extends, is swingably suspended from the front casing section 25 by alined pivot pins 35.

The elongated shaft member 11 which carries the saw blade 10 at its semi-cylindrical front end, has its cylindrical medial portion slidably confined within the relatively long front guide bearing 12, while its rear portion is flattened at the bottom and is likewise slidably confined in the rear bearing 13 which is mounted in the casing wall 27 as shown in Figs. 1, 3 and 4. The front semi-circular end of this reciprocable member 11 serves to hold the flat saw blade 10 in a vertical plane, while the rear flattened portion thereof functions to prevent rotation of the member 11 about its longitudinal axis, and the socket 21 is firmly but removably attached to the bottom of the flattened portion of the member 11 by means of cap screws 37. The rotary crank shaft 14 is disposed laterally of but parallel to the shaft member 11 and is confined within the casing 7 by the front roller bearing 15 and by the rear ball bearing 16 which is also mounted in the transverse casing wall 27 beneath the guide bearing 13, see Fig. 1.

The oblique crank 17 which is formed integral with the shaft 14 between the bearings 15, 16, coacts with the oscillatory arm element 18 through the bearing 19 to swing the element 18 back and forth about this bearing 19 whenever the shaft 14 is rotated, and the bearing 19 is also of the anti-friction or ball type. The spherical head 20 is oscillatably confined within the socket 21 carried by the shaft member 11 and is formed integral with a shank 38 snugly coacting with a bore in the arm element 18 and detachably confined therein by a set screw 39, coacting with a flat spot 40 on the shank 38, as clearly illustrated in Fig. 3. The oscillatory or swinging motion of the arm element 18 and head 20 is thus positively confined to the common vertical plane of the shaft 14 and shaft member 11, by the crank 17 and socket 21.

The smaller driving gear 22 is formed directly upon the power shaft 42 of the electric motor rotor 9, and this shaft 42 is likewise journalled for rotation in a ball bearing 43 mounted in the casing closure 26, while the larger driven gear 23 is removably secured to the rear extremity of the crank shaft 14 by a Woodruff key 44 and a disk 45 attached to the shaft 14 by means of a cap screw 46, see Figs. 1 and 4. The shafts 42, 14 and the oscillatory arm element 18 are therefore all mounted upon anti-friction bearings 43, 15, 16, 19 so as to reduce friction losses to a minimum and to insure smooth and vibration free conversion of the rotary driving motion of the motor 8 into rapid reciprocating movement of the saw blade 10; and when the blade attaching screw 32 has been removed and the fastening screws 28 are released, the motor 8 may be withdrawn to permit unobstructed removal of the casing sections 26, 27 and of all of the internal normally concealed mechanism, through the larger rear end of the casing 7.

The propelling motor 8 is of light but powerful and relatively standard construction, and is provided with a pistol grip manipulating handle 47 for the unit as indicated in Fig. 5. The manipulating handle 47 of the electric motor 8 is also provided with a control switch 48, and in order to relieve the shaft 14 from excessive end thrust, the ball bearing 16 may be provided with a thrust plate 49 secured to the casing wall 27 by one or more screws 50, as depicted in Figs. 1 and 4. The usual provision for maintaining all of the bearings amply lubricated, should also be made, and when the improved sawing unit has been properly constructed and assembled, its normal operation is as follows.

The electric motor 8 may be placed in operation by actuating the switch 48, thereby causing the small gear 22 on the motor shaft 42 to rapidly revolve the larger gear 23 and crank shaft 14, whereupon the revolving angular crank 17 likewise rapidly oscillates the arm element 18 and spherical head 20 to thereby reciprocate the shaft member 11 and saw blade 10 at high speed. In order to apply the tool to a flat or thin work sheet 30, the saw blade 10 may be applied either to a marginal edge of the sheet 30 or to a medial portion thereof by initially holding the unit firmly against the material using the lower edge of the guide shoe 33 as a fulcrum and by thereafter pressing the starting switch 48. With the saw blade 10 in motion, the front end of the casing 7 should be swung downwardly to cause the pointed blade end 29 to contact and pierce the sheet 30, whereupon the unit may be swung into vertical position with the shoe 33 flatly engaging the upper surface of the sheet 30 and the rapidly reciprocating blade 10 may be advanced in any desired direction to effect sawing with the aid of the handle 47.

After considerable hard usage of the tool, the bearing surfaces between the spherical head 20 of the oscillating arm element 18 and the socket 21 may become worn to such an extent as to require replacement of these parts, and such replacement may be readily effected by merely removing the shaft member 11 and the arm element 18 from within the casing 7, and by thereafter releasing the screws 37, 39. Various different types of saw blades 10 may also be applied to the front end of the shaft member 11 by merely releasing and reapplying the screw 32, in order to enable the use of the unit when sawing different kinds of material; and with the exception of the protruding portion of the saw blade 10, all movable parts of the tool are normally well concealed and protected by the casing 7 while still being readily accessible for inspection and removal.

From the foregoing detailed description it will be apparent that the present invention provides a portable reciprocating saw which is simple, compact and durable in construction and highly efficient in use for performing various types of cutting. The improved unit is light in weight but powerful, and may be readily manipulated with utmost safety to saw either wood, metal, or composition materials along straight, curved or irregular lines of cleavage with greatest ease due to the rapid reciprocation of the well guided saw blade 10. The motion converting mechanism of the assemblage is exceedingly simple but rugged in structure, and dependable in action, and the use of anti-friction bearings insures smooth operation with least vibration and also reduces the power consumption to a minimum. The entire device may be quickly and conveniently assembled or dismantled, and may be manufactured in various sizes for diverse uses at moderate cost; and the term "saw blade" as used herein is intended to include various types of cutting and abrasion tools such as saws, files and similar implements.

It should be understood that it is not desired to limit this invention to the exact details of construction and operation of the portable reciprocating saw unit herein specifically shown and described, for various modifications within the scope of the appended claims may occur to persons skilled in the art.

We claim:

1. In combination, a rearwardly open unitary casing having therein lower and upper fixed front bearings, a wall detachably secured to the open rear end of said casing and having therein complementary lower and upper bearings, a rotary drive shaft journalled in said complementary lower bearings and having an intermediate crank the axis of which is inclined relative to the shaft axis, a longitudinally reciprocable driven shaft slidably confined within said complementary upper bearings for movement parallel to said drive shaft and having thereon a socket facing said crank, an oscillatory element journalled upon said crank and having a member rockably engaging said socket and swingable in the common plane of the axes of said parallel shafts, and means for rotating said drive shaft to reciprocate said driven shaft.

2. In combination, a rearwardly open unitary casing having therein lower and upper fixed front bearings, a wall detachably secured to the open rear end of said casing and having therein complementary lower and upper bearings, a rotary drive shaft journalled in said complementary lower bearings and having an intermediate crank the axis of which is inclined relative to the shaft axis, a longitudinally reciprocable driven shaft slidably confined within said complementary upper bearings for movement parallel to said drive shaft and having thereon a socket facing said crank, an oscillatory element journalled upon said crank and having a member rockably engaging said socket and swingable in the common plane of the axes of said parallel shafts, and means for rotating said drive shaft to reciprocate said driven shaft, said shafts being removable only through the rear open end of said casing.

3. In combination, a rearwardly open unitary casing having therein lower and upper fixed front bearings, a wall detachably secured to the open rear end of said casing and having therein complementary lower and upper bearings, a rotary drive shaft journalled in said complementary lower bearings and having an intermediate crank the axis of which is inclined relative to the shaft axis, a longitudinally reciprocable driven shaft slidably confined within said complementary upper bearings for movement parallel to said drive shaft, said upper rear bearing having a semi-cylindrical bearing surface and said driven shaft having a semi-cylindrical rear portion cooperable with said surface to prevent rotation of the driven shaft, a socket detachably secured to said semi-cylindrical driven shaft portion and facing said crank, an oscillatory element journalled upon said crank, a member detachably secured to said element and rockably coacting with said socket to reciprocate the latter in the common plane of the axes of said parallel shafts, and means coacting with said drive shaft outwardly beyond said wall for rotating the drive shaft and reciprocating the driven shaft.

References Cited in the file of this patent

UNITED STATES PATENTS

| | | |
|---|---|---|
| 1,035,524 | Bradley | Aug. 13, 1912 |
| 1,351,753 | Hover | Sept. 7, 1920 |
| 1,430,275 | Almen | Sept. 26, 1922 |
| 1,679,884 | Thomas | Aug. 7, 1928 |
| 1,707,097 | Ruschke | Mar. 26, 1929 |
| 1,877,462 | Holle | Sept. 13, 1932 |
| 2,469,277 | Schmidt | May 3, 1949 |
| 2,488,998 | Turkowski | Nov. 22, 1949 |
| 2,601,788 | Parker | July 1, 1952 |

OTHER REFERENCES

Popular Science, pp. 207–209, February 1948.